T. QUINN.
Cotton-Press.
No. 219,517.  Patented Sept. 9, 1879.
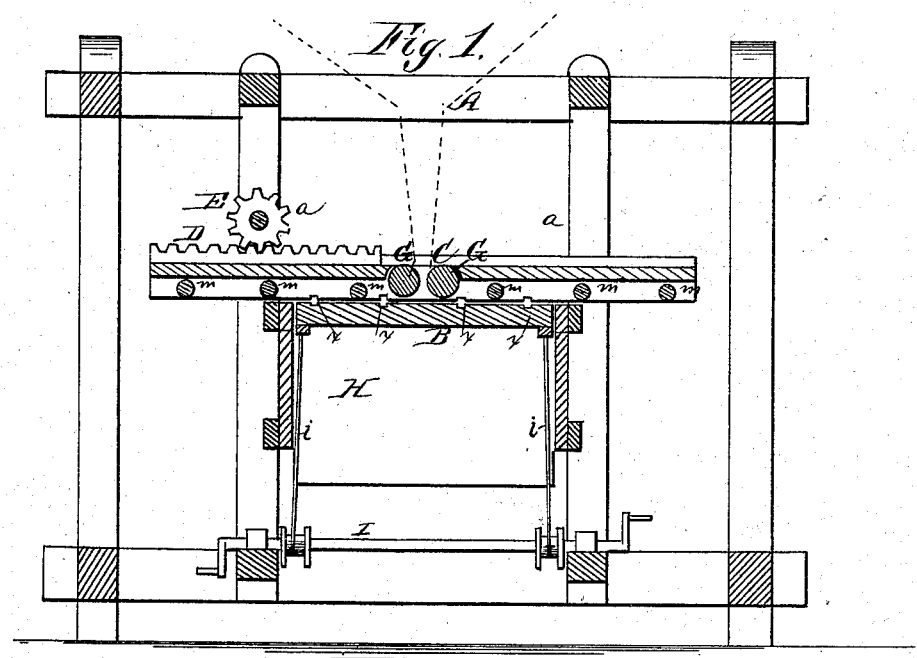
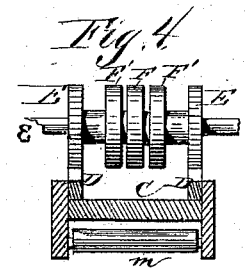
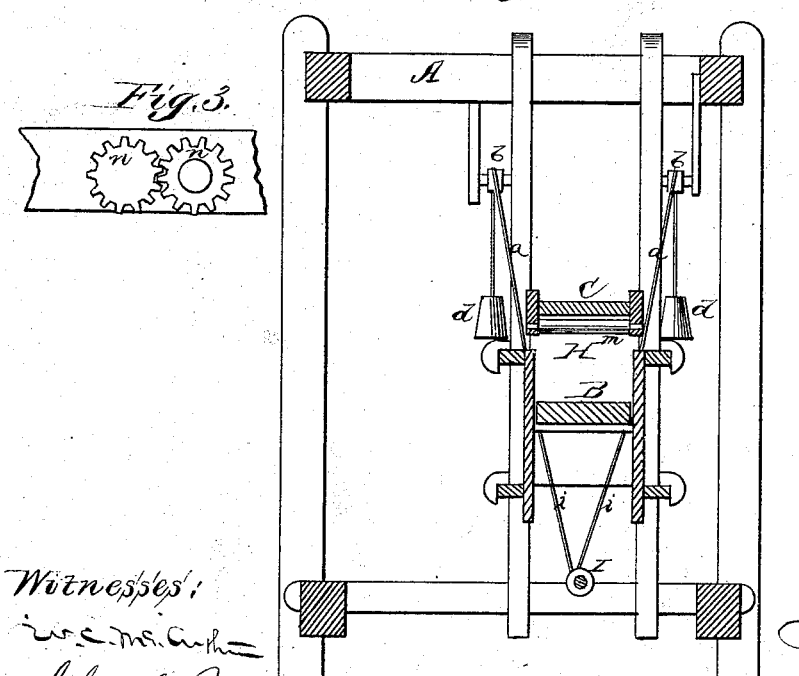
Witnesses:
Inventor
Thomas Quinn
per
J. H. Alexander & Elliott
Attorneys

UNITED STATES PATENT OFFICE.

THOMAS QUINN, OF MACON, GEORGIA.

IMPROVEMENT IN COTTON-PRESSES.

Specification forming part of Letters Patent No. 219,517, dated September 9, 1879; application filed July 29, 1879.

*To all whom it may concern:*

Be it known that I, THOMAS QUINN, of Macon, in the county of Bibb and State of Georgia, have invented certain new and useful Improvements in Cotton-Presses; and I do hereby declare that the following is a full, clear, and exact description thereof, reference being had to the accompanying drawings, and to the letters of reference marked thereon, which form part of this specification.

The nature of my invention consists in the construction of a press for packing cotton or other fibrous material direct from the gin or other mechanism in layers, so that the same amount of pressure is distributed equally throughout the whole package.

In order to enable others skilled in the art to which my invention appertains to make and use the same, I will now proceed to describe its construction and operation, referring to the annexed drawings, in which—

Figure 1 is a longitudinal section; Fig. 2, a cross-section; and Figs. 3 and 4 are details of parts of my invention.

A represents a suitable frame-work, which may be the frame of the gin-house, and which contains the press.

B is the platen or bed-plate, on which the cotton is packed, and which has in its upper face several grooves, $x\ x$, through which the hoops or bands may be thrust for fastening the bale when full.

The platen or bed-plate B is suspended by means of cords $a$ passing over pulleys $b$, and having weights $d$ attached to their ends. The plate B being thus held by weights, any pressure necessary may be used by attaching any number of weights during the filling of the bale.

C is a movable top or plate, which will keep the cotton or other material pressed solid as it comes from the gin or other mechanism through a canvas chute or any suitable conveyer, as shown in dotted lines in Fig. 1. This top plate is twice as long as the package to be pressed, and the machinery to assist in pressing will be attached to it and add to its weight.

On top of the plate C, at one end, are two rack-bars, D D, into which pinions E E work, which pinions may be driven by two belts—one straight and the other crossed—so as to move the plate C back and forward. These pinions are on a shaft, $e$, which also carries a tight pulley, F, and two loose pulleys, F' F', so that one belt will drive the plate C forward and the other back, and when both belts are on the loose pulleys the plate will stop entirely.

In the top or plate C is an opening, in which are located two condensing-rollers, G G, to receive the cotton as it falls through a flexible tube of cloth or other material from the gin.

H is the box, open at top and bottom, surrounding the bale, for the purpose of keeping it from spreading. The sides of the box are movable, so that the bale can be taken out.

Under the box is a windlass, I, connected by cords $i$ with the bed B, for lowering the same far enough to allow the bale to be removed, and also to regulate the ascent of the bed-plate after the bale is removed.

In manufacturing cotton it has always been found that the cotton from the middle of the bale works better than the outsides, owing to the extra pressure exerted on the outside in the present mode of packing.

With my machine the cotton falls into the press directly from the gin, and a uniform pressure is exerted from the commencement to the completion of the bale. I am also enabled to put more cotton in the same space without any undue pressure on any part thereof.

The reciprocating top C is provided with friction-rollers $m$, to make it move freely and easily under pressure.

The condensing-rollers G G are geared together by pinions $n\ n$, and may be caused to rotate by means of a cord passed around a pulley on the end of one of the rollers and secured to the frame, thus feeding the cotton into the press.

Having thus fully described my invention, what I claim as new, and desire to secure by Letters Patent, is—

1. The bed-plate B, suspended by means of weighted cords $a$, in combination with a windlass, I, and cords $i$, for lowering the same, substantially as herein set forth.

2. The combination of the top C, rack-bars D D, pinions E, shaft $e$, and pulleys F F', substantially as herein set forth.

In testimony that I claim the foregoing as my own I affix my signature in presence of two witnesses.

THOMAS QUINN.

Witnesses:
R. S. WYNN,
H. S. EDWARDS.